(12) United States Patent
Jeffryes (10) Patent No.: US 7,295,926 B2
(45) Date of Patent: Nov. 13, 2007

(54) METHOD FOR CORRELATING WELL LOGS

(75) Inventor: Benjamin Peter Jeffryes, Histon (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 237 days.

(21) Appl. No.: 10/496,824

(22) PCT Filed: Dec. 5, 2002

(86) PCT No.: PCT/GB02/05486

§ 371 (c)(1),
(2), (4) Date: Apr. 14, 2005

(87) PCT Pub. No.: WO03/050570

PCT Pub. Date: Jun. 19, 2003

(65) Prior Publication Data

US 2005/0228590 A1    Oct. 13, 2005

(30) Foreign Application Priority Data

Dec. 13, 2001 (GB) ................... 0129794.4

(51) Int. Cl.
*G06F 19/00* (2006.01)
*E21B 49/00* (2006.01)
(52) U.S. Cl. ...................... 702/6; 340/854.1
(58) Field of Classification Search ............... 702/1–8; 340/854.1, 855.3
See application file for complete search history.

(56) References Cited

U.S. PATENT DOCUMENTS

| 3,497,958 A | | 3/1970 | Gollwitzer |
| 3,566,478 A | | 3/1971 | Hurlston |
| 4,312,040 A | | 1/1982 | Tinch et al. |
| 4,320,469 A | | 3/1982 | Frawley et al. |
| 4,556,884 A | | 12/1985 | Howells et al. |
| 4,843,875 A | | 7/1989 | Kerbart |
| 5,062,048 A | * | 10/1991 | Coulter et al. ........... 702/6 |
| 5,321,982 A | | 6/1994 | Fäy et al. |
| 5,522,260 A | | 6/1996 | Chappellat et al. |

FOREIGN PATENT DOCUMENTS

| FR | 2 591 758 A1 | 12/1985 |
| WO | 00/22456 A1 | 4/2000 |
| WO | 03/050570 A1 | 6/2003 |

\* cited by examiner

*Primary Examiner*—Donald E. McElheny, Jr.
*Assistant Examiner*—Victor J Taylor
(74) *Attorney, Agent, or Firm*—Steven Gahlings; Vincent Loccisano; Jody Lynn DeStefanis (57) ABSTRACT

Embodiments of the present invention provide methods for correlating well logs. More specifically, but not by way of limitation, in an embodiment of the present invention, data from two or more overlapping logs may be generated by a well logging device and a model for the apparent compliance of the elongate member (e.g. the drill string), which controls the position of the logging device, may be combined to correlate the log data.

15 Claims, 7 Drawing Sheets

METHOD FOR CORRELATING WELL LOGS

This application is a national phase application (371) of PCT/GB02/05486 filled on 5 Dec. 2002 and claims priority to UK 0129794.4 filled on 13 Dec. 2001 and now GP 2383146 on 2 Jun. 2004, the entire contents of which are herein incorporated by reference.

FIELD OF THE INVENTION

The present invention relates to a method for correlating well logs.

BACKGROUND OF THE INVENTION

Well logging tools are commonly used in well drilling and production operations to characterise wells. Such tools may comprise e.g. gamma-ray or electrical resistivity sensors which provide information on the lithology of the rock formation traversed by the well. Most sensors are set up to make measurements at regular time intervals as the logging tool travels along the well. Thus typically a log produced by a sensor comprises a series of measurements taken at particular times which correspond to spaced positions along the well. However, a problem arises when the logging tool velocity varies, as the longitudinal spacing of the measurement positions also then varies and the resulting log can be difficult to interpret.

Furthermore, when different logs are produced for the same stretch of well by a logging tool having spaced sensors or by the same sensor at different times, it can be difficult properly to match or correlate the features of one log with the features of another because of the variation in measurement position.

This problem is particularly acute for LWD (Logging While Drilling) operations because the process of drilling generally involves irregular drill string movements and hence large changes in velocity (and even reversals of direction) of the logging tool. Thus LWD logging tool velocity is prone to significantly more variation than the velocity of e.g. a logging tool or "sonde" controlled by a wireline.

During well drilling it is usually important to be able to determine the position and/or rate of penetration of the drill bit. However, while the movement of a drill bit is controlled to a significant extent by the movement of the drill string at the well surface which in turn is controlled by the hook load applied to the drill string, the precise way in which these parameters impact on the movement of the drill bit can be complicated. This is because the apparent compliance of the drill string is not determined solely by the physical properties and length of the drill string. Thus a correction needs to be introduced if the surface movement of the drill string is to be used to predict the downhole movement of the drill bit.

The apparent compliance of the drill string can be influenced by many factors. For example, there is usually significant friction between the string and the walls of the well, as well as changing thrust loads exerted on the string. Insofar as these factors can be determined with any precision, they add considerable complexity to the determination of the drill string compliance. Inaccuracies, such as calibration problems, wear etc., in the surface draw works system for measuring block height may also be complicating factors. Thus mere knowledge of the instantaneous hook load and the instantaneous velocity of the drill string at the surface may not supply the well operator with enough information to correct the relative depth and penetration rate of the drill bit with sufficient accuracy.

In an attempt to overcome this problem, U.S. Pat. No. 4,843,875 describes a procedure for measuring drill bit rate of penetration which assumes that the behaviour of the drill string can be modelled by a relationship of the form:

$$V_F = V_S + \lambda \frac{dF}{dt}$$

where $V_F$ is the instantaneous velocity of the drill bit, $V_S$ is the instantaneous velocity of the drill string at the surface, $\lambda$ is the apparent compliance of the drill string, and $dF/dt$ is the first derivative with respect to time of the weight F suspended from the hook.

To be fully effective this approach requires a very good hookload measurement—so that not only the hookload but also the rate-of-change of hookload can be accurately derived. Errors due to friction in the rig apparatus can produce significant errors in the rate-of-change of hookload.

An alternative procedure, described in U.S. Pat. No. 5,321,982, uses a well tool having at least two logging sensors which are spaced a known distance apart in the direction of movement of the tool. By matching the logs produced by the sensors it is possible to determine the instantaneous velocity (i.e. rate of penetration) of the tool. However, because drill bit penetration rates generally do not vary smoothly, this approach has little predictive capacity for drilling operations.

U.S. Pat. No. 5,522,260 discloses a procedure for performing depth correction on a logging tool having two spaced sensors in which the tool is provided with an accelerometer. In this procedure, the tool velocity determined by correlating the sensor logs is combined with the tool velocity determined by the accelerometer to produce a depth correction for the tool. However, this procedure is not particularly suitable for LWD operations because LWD logging tools are not usually provided with accelerometers.

SUMMARY OF THE INVENTION

At least in part, therefore, the present invention aims to alleviate or avoid some of the aforementioned problems.

In general terms the present invention provides a method for correlating well logs, in which data from two or more overlapping logs generated by a well logging device and a model for the apparent compliance of the elongate member (e.g. the drill string) which controls the position of the logging device are combined to correlate the log data.

Thus a first aspect of the present invention provides a method of correcting depth of logging data measured by a logging system mounted on an elongate member extending through a wellbore to the surface. The method comprises the following steps.

Receiving sets of logging data for two or more spatially overlapping logs generated by the logging system, each set comprising measures of a characteristic associated with the wellbore at longitudinally spaced positions along the wellbore.

Receiving measurement data for the period or periods of log generation, the measurement data comprising measurements of the load on the elongate member and measurements of the surface position of the elongate member.

Determining a compliance parameter representing the compliance of the elongate member by comparing at least two of the sets of logging data depth corrected using a plurality of values for the compliance parameter, and selecting a value for the compliance parameter that yields a high degree of consistency between the at least two sets of logging data.

And correcting the depth of at least one set of logging data measured using the logging system, using a correction function which relates the position of the logging system to at least (i) the measured load on the elongate member, (ii) the measured surface position of the elongate member, and (iii) the selected compliance parameter of the elongate member.

Typically the elongate member compliance is an apparent compliance. Furthermore, typically either or each of the position of the logging member and the surface position of the elongate member is a relative position.

Although, the correlation of the logs may be an end in itself, the compliance thus-determined can also be used to correct the depth of the logging device. Therefore, preferably the method comprises the further step of obtaining a corrected depth (or relative depth) for the logging device on the basis of the compliance. The corrected depth is typically obtained by applying the compliance to the correction function. However, this does not exclude the possibility that the compliance may be applied, e.g. to a different correction function, to obtain the corrected depth.

The degree of correlation of the logs may be determined by a suitable objective correlation function, such as a scalar correlation coefficient in the case where two logs are correlated or a cross correlation matrix in the case where more than two logs are correlated.

Typically the step of correlating the sets of logging data involves an optimisation procedure so that the elongate member compliance which best corrects the positions of the measured well characteristics is determined.

For example, the process of correlation may involve iteratively testing different values for the compliance until the compliance which produces the highest degree of correlation between the logs is established. Such testing may be performed numerically. For example, a Monte-Carlo or simulated annealing procedure may be used to obtain a provisional optimal compliance which may then be further refined by a local technique such as gradient descent. Other suitable techniques are known to the skilled person.

The measured load on the elongate member can be e.g. a surface load or a downhole load. For example, when the elongate member is a drill string the measured load can be the hookload or the load near the drill-bit (i.e. the weight-on-bit).

An advantage of the method is that log correlation and optionally depth correction can be performed without accelerometer data from the logging device. Hence the method is particularly suited for use in LWD operations, and in preferred embodiments the elongate member is a drill string. The optimal compliance can then be used to correct the depth of the drill bit. For example, during LWD operations the logging device and drill bit are usually sufficiently close such that the compliance of the intervening drill string can be neglected. Thus the logging device and the drill bit can be considered as being rigidly connected and the correction of the depth of the logging device then effectively also corrects the depth of the drill bit.

However, the method has more general applicability and may also be used e.g. to provide log correlation and optionally depth correction for a wireline sonde (in which case the elongate member would be the wireline cable).

Furthermore, on the assumption that the compliance determined for the elongate member is valid at times outside the period or periods over which the logs are generated, the (or another) correction function can be used to make depth correction predictions outside these periods. This is in contrast to the procedure described in U.S. Pat. No. 5,321, 982, which only allowed instantaneous tool velocities to be determined.

In simple embodiments, the correction function may be similar to that used in U.S. Pat. No. 4,843,875. The compliance then takes a single numerical value. Alternatively, however, more complex functions may be used e.g. allowing different numerical values for the compliance depending on the type of drilling operation (for example rotating or sliding), and/or allowing the compliance to vary with depth.

Compensation factors can be included in the correction function to account for instances when depth measurement errors are likely to occur. Typically, the or each compensation factor corresponds to a distance or depth offset occurring at a known time (either the time of the connection, or the time the direction of motion of the drill string is reversed).

A first example of a depth measurement error relates to the lengthening of a drill string. As drilling progresses, lengths of pipe are added to the drill string. This involves hanging the drill string from the rig floor (referred to as "placing in slips"), disconnecting the mud circulation, screwing a new length of pipe onto the existing pipe, reconnecting the mud circulation, and resuspending the drill string from the drawworks. In order to base a depth measurement on the number of pipes suspended from the drawworks, a good estimate of the additional length of pipe may be required. However, it is commonplace for errors to occur at this stage, e.g. due to calibration errors or incorrect tabulation of the lengths of the pipes, and an error here will produce an offset for all measurements made (in time) after the connection.

A second example is when the direction of drill string motion is reversed because of slack in the cable system.

Each of these types of error can be accounted for in the correction function by introducing a single value compensation factor (e.g. a position or depth offset) occurring at a known time (e.g. the time of the connection, or the time the direction of motion of the drill string is reversed).

Generally the degree of correlation between the sets of logging data will improve with complexity of the function. However, as the complexity of the function increases, the number of parameters which define the compliance and which require determination during the correlation also tends to increase, and at some point the process of correlation may become ill-conditioned.

The logging device may comprise two or more logging sensors (e.g. gamma ray sensors or electrical resistivity sensors) spaced in the direction of device movement, the logging sensors generating respective logs over substantially the same time period. Preferably the spaced logging sensors are of similar type so that the sensors respond in the same manner to the well lithology. This improves the degree of correlation which can be obtained between the logging data. However, spaced sensors of different type may also be used, although desirably these should react sufficiently similarly to the well lithology.

The method may also be applied, however, to correlate sets of spatially overlapping logging data generated by one logging device over non-overlapping time periods. For example, during LWD a first set of logging data may be generated as the drill bit extends the well, and a spatially overlapping second set of data may be generated as the drill bit is lifted off bottom.

The method of the invention discussed above may conveniently be implemented in software, for execution on any appropriate digital computer including one or more memory devices for storing the various data and one or more processors for executing the method.

Thus further aspects of the invention respectively provide a system (such as a computer or linked computers) operatively configured to implement the method of the previous aspect of the invention; computer programming product or products (such as ROM, RAM, floppy discs, hard drives, optical compact discs, magnetic tapes, and other computer-readable media) carrying computer code for implementing the method of the previous aspect of the invention; and a computer program per se for implementing the method of the previous aspect of the invention.

For example, a further aspect of the present invention may provide a system for correlating two or more overlapping well logs generated by a well logging device which, in use, is positioned in a well and is mounted to an elongate member extending along the well to the surface, movement of the elongate member at the surface controlling movement of the logging device along the well;

the system comprising:

a data storage device for storing (i) sets of logging data for two or more spatially overlapping logs generated by the logging device, each set comprising measures of a characteristic of the well at longitudinally spaced positions along the well, and (ii) measurement data for the period or periods of log generation, the measurement data comprising measurements of the load on the elongate member and measurements of the surface position of the elongate member; and a processor for correlating the sets of logging data by determining an elongate member compliance which corrects the positions of the measured well characteristics, the corrections being performed on the basis of a correction function which relates the position of the logging device to at least (i) the measured load on the elongate member, (ii) the measured surface position of the elongate member, and (iii) the compliance.

DESCRIPTION OF THE DRAWINGS

Embodiments of the invention will now be described by way of example with reference to the accompanying drawings in which.

DETAILED DESCRIPTION

Figure 1:
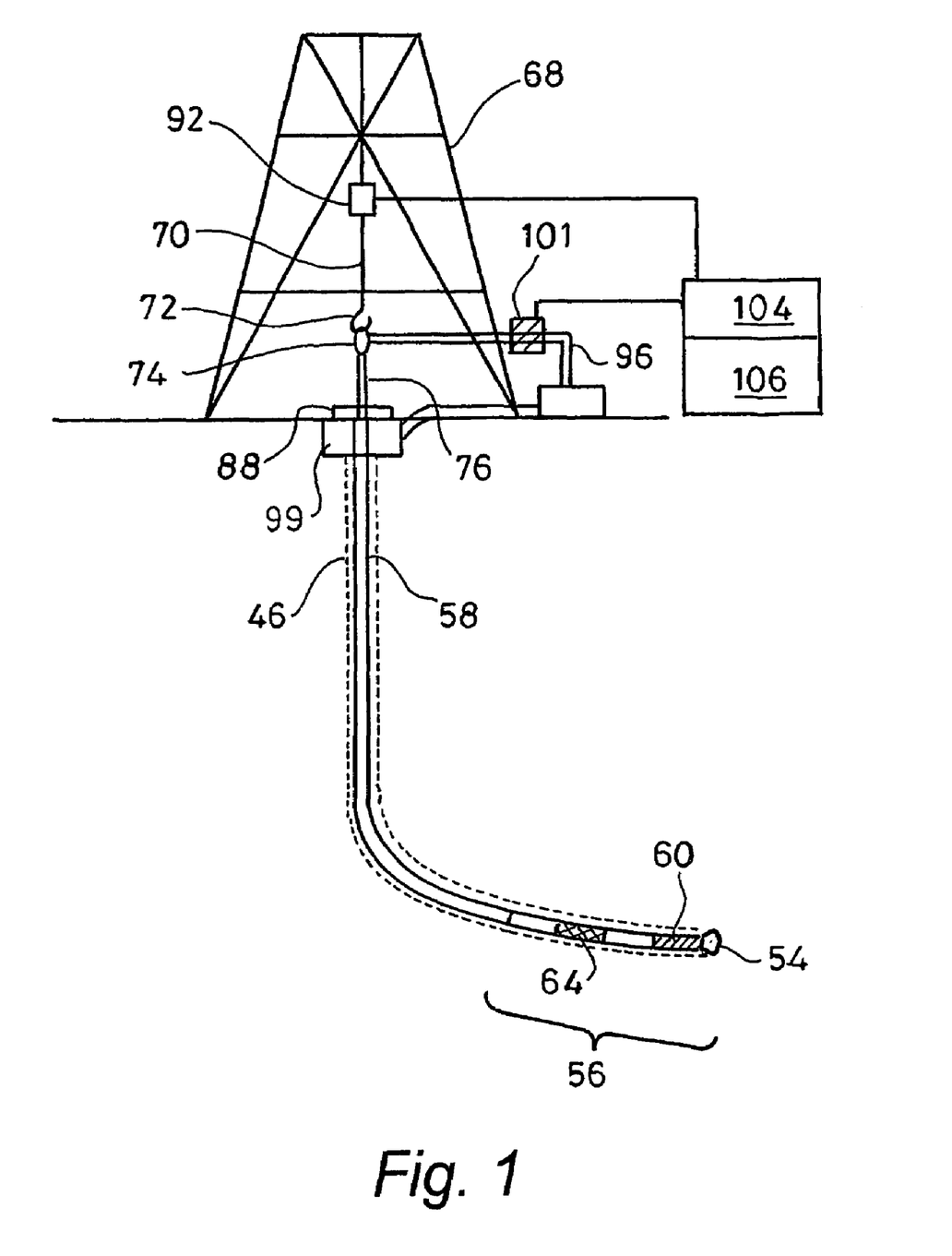
FIG. 1 shows schematically a hydrocarbon well.

FIG. 1 shows schematically a hydrocarbon well. Drill string 58 is within borehole 46 which is being cut by the action of drill bit 54. Drill bit 54 is disposed at the far end of the bottom hole assembly 56 that is attached to and forms the lower portion of drill string 46. Bottom hole assembly 56 contains a number of devices including logging-while-drilling (LWD) subassemblies 60 which measure a well characteristic or characteristics. Examples of typical LWD measurements include downhole pressure (inside and outside the drill pipe), resistivity, density, and porosity.

The drilling surface system includes a derrick 68 and hoisting system, a rotating system, a mud circulation system (not shown), and a blowout preventer 99. The hoisting system which suspends the drill string 58, includes draw works 70, hook 72 and swivel 74. The rotating system includes kelly 76, rotary table 88, and engines (not shown). The rotating system imparts a rotational force on the drill string 58 as is well known in the art. The hoisting and rotating systems effectively control the movement of the drill bit and LWD subassemblies.

Although a system with a kelly and rotary table is shown in FIG. 1, those of skill in the art will recognize that the present invention is also applicable to top drive drilling arrangements. Also, although the drilling system is shown in FIG. 1 as being on land, those of skill in the art will recognize that the present invention is equally applicable to marine environments.

The measurement signals from the LWD subassemblies are transmitted to pulser assembly 64. Pulser assembly 64 converts the signals from subassemblies 60 into pressure pulses in the drilling fluid. The pressure pulses travel upwards though the drilling fluid in the central opening in the drill string and towards the surface. At the surface the mud pulses are detected by a pressure pulse sensor 101 mounted on stand pipe 96. The sensor 101 comprises a transducer that converts the mud pressure pulses into electronic signals. These signals are then converted into digital form and transmitted to storage system (e.g. a hard drive) 104 as well logs for subsequent analysis.

The skilled person would recognise, however, that other telemetry systems, involving e.g. electrical transmission or acoustic wave propagation, may be used to provide communication between the LWD subassemblies and the surface.

While the LWD subassemblies are measuring downhole well characteristics, a surface load sensor 92 measures the hookload. The relative position of the hook, or other indicator of the surface position of the drill string, is also measured. These measurements are transmitted to storage system 104 and stored for subsequent analysis. The processor 106 which may comprise multiple computer processing systems, is used to determine the compliance in the drill string 58 and correct the stored logs according the description below.

Although a surface load sensor is shown, downhole load measurements may be taken instead. For example, weight-on-bit measurements may be taken at subassemblies 60 and then transmitted to the surface using pulser assembly 64.

The method of the present invention is then used to correlate overlapping well logs produced by the LWD subassemblies. The well logs may overlap because the same well position has been traversed by different longitudinally spaced sensors of the LWD subassemblies, or because the same sensor has traversed the same position more than once as the drill string is raised and lowered in the borehole.

Figure 2:
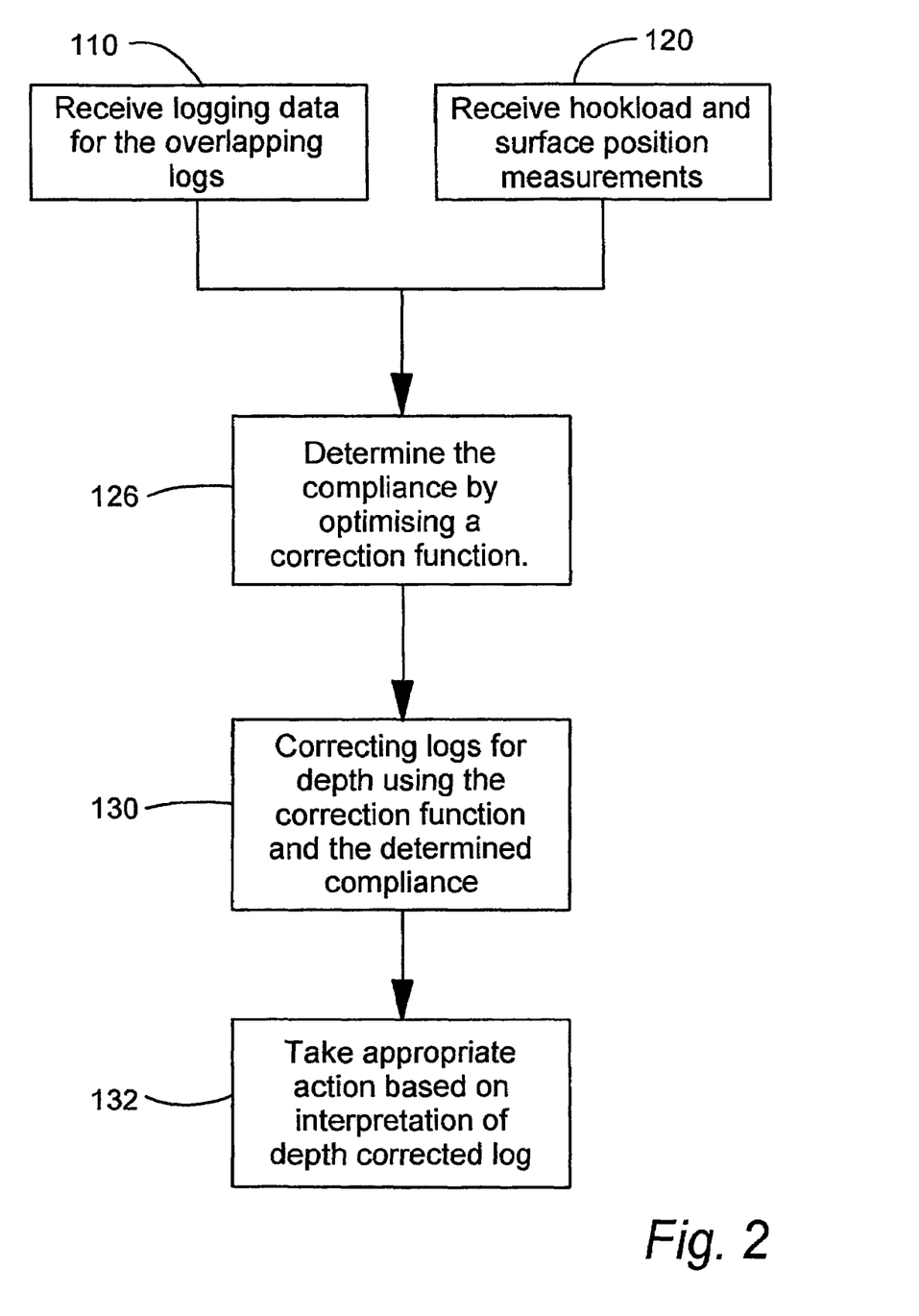
FIG. 2 is a flow diagram which shows the steps of the method of the invention.

FIG. 2 is a flow diagram which shows the steps of the method, which may be performed by a suitably programmed computer.

Firstly, at step 110 sets of logging data for the overlapping logs are received, and at step 120 hookload and surface position measurements are received for the period or periods of logging data generation. In step 126 a compliance parameter is determined representing the compliance of the elongate member by comparing at least two of the sets of logging data depth corrected using a plurality of values for the compliance parameter, and selecting a value for the compliance parameter that yields a high degree of consistency between the at least two sets of logging data.

Then at step 130 the depth of at least one set of logging data measured using the logging system is depth corrected using a correction function which relates the position of the logging system to at least (i) the measured load on the elongate member, (ii) the measured surface position of the elongate member, and (iii) the selected compliance parameter of the elongate member. The corrections are performed on the basis of a correction function which is discussed in more detail below. Finally, in step 132 corrective action is taken based on the interpretation of the depth corrected log. Examples of such correcting action include updating an earth model and/or subsequent construction of the wellbore based on the corrected log.

The correction function relates the position of the logging device to the load on the elongate member, the surface position of the elongate member, and the compliance or apparent compliance of the elongate member. In simple embodiments this function may be of the form:

$$D(t) = d(t) + \lambda W(t)$$

where $D(t)$ is the corrected relative position of the logging device at a particular instant $t$, $d(t)$ is the corresponding relative surface position of the elongate member (i.e. the uncorrected relative depth of the logging device), $W(t)$ is the corresponding load on the elongate member (e.g. the hook load or weight-on-bit when the elongate member is a drill string), and $\lambda$ is the compliance of the elongate member.

Assuming there are two overlapping logs $\gamma_1$ and $\gamma_2$ produced by respective sensors spaced a distance $L$ apart in the direction of the well, then the problem may be to find a value for $\lambda$ such that the logs are optimally correlated. This can be done, for example, by optimising an appropriate objective function. Thus the expectation value, $E$, may be minimised, where $E$ is given by:

$$E = \langle \gamma_1(D^{-1}(x)) - \gamma_2(D^{-1}(x-L)) \rangle,$$

$\gamma()$ being the measured value of the well characteristic from the respective log at a particular instant, $D^{-1}()$ being the inverse of the correction function, and $x$ being the relative position of the logging device. An alternative would be to maximise the correlation coefficient, $C$, given by:

$$C = \frac{\langle \Upsilon_1(D^{-1}(x)) \Upsilon_2(D^{-1}(x-L)) \rangle}{\langle \Upsilon_1(D^{-1}(x)) \rangle^{1/2} \langle \Upsilon_2(D^{-1}(x-L)) \rangle^{1/2}}$$

The analysis is the same when the overlapping logs are produced by the same sensor at different time periods, except that compensation for the distance, $L$, is not required (i.e. $L=0$).

The optimisation can be carried out numerically, e.g. by combining global procedures (such as Monte-Carlo techniques or simulated annealing) with local procedures (such as gradient descent). As a result of this approach, an overall depth may be introduced, but this can be overcome by manually tying some points in the logs or by using the deviation from a particular weight, $W_0$, rather than the absolute load, $W$, in the (inverse of the) correction function.

More generally the correction function may be of the form:

$$D(t) = d(t) + \Lambda(t)(W(t) - W_0) + \sum_j C_j(t - t_j)$$

where $\lambda$ is the apparent compliance of the elongate member and (for the example of a drill string) takes one value while sliding and another while rotating; $t_j$ are times of events where depth errors may be introduced such as (again for the example of a drill string) connections, lifting off bottom events, rotating to sliding transitions; and $C_j$ are compensation factor constants for those errors.

Taking the example of a drilling operation in which the overlapping logs are obtained over a period which starts with rotating drilling, switches to sliding and switches back to rotating drilling, and comes of bottom at each transition, there will be two $\lambda$ values (one for rotation and one for sliding) and two $C_j$ constants (one for each transition) to optimise.

Additionally the compliance may be allowed to change with depth to account for the lengthening of the drill string.

If the two logs derive from sensors of different type, the procedure for optimising the correlation between the logs can still be followed. However, whereas for e.g. two gamma-ray logs produced by identical sensors the only differences between them should be from noise so that high degrees of correlation should be obtained, with different sensors responding to the same lithology a lower degree of correlation should be expected.

With more than two overlapping logs, the procedure can be made more robust, at the expense of computational complexity. Instead of optimising objective functions, such as the expressions for the expectation value and the correlation coefficient, which provide scalar values, it is possible to calculate the cross correlation matrix, $M$, between the logs $\mu$. If each log is derived from a respective sensor spaced a respective distance $L$ from a reference position on the logging device, the value of each element of $M$ is given by:

$$M_{ij} = \langle \mu_i(D^{-1}(x - L_i)) \mu_j(D^{-1}(x - L_j)) \rangle$$

The optimised correlation is obtained when the ratio between the higher and lower eigenvalues of the matrix is maximised. Indeed, in the case where there are two logs, maximising this ratio is equivalent to maximising the correlation coefficient, $C$.

The method can be further extended to a tool which makes a number of measurements at different borehole azimuths at each of several longitudinal positions along the tool. A known example of such a tool (an azimuthal resistivity tool) makes 56 azimuths at three longitudinal positions. In this case, only measurements taken at different longitudinal positions whose azimuths align would be correlated, leading to separate cross correlation matrices and sets of eigenvalues for each of the 56 azimuths. The optimisation then involves the maximisation of a function of the eigenvalue ratios of the respective matrices. Different functions can be envisaged, such as the sum of the eigenvalue ratios or the sum of the logarithms of the ratios.

In each of the various examples described above, the process of correlating logs results in an optimal compliance for the elongate member. This compliance may then be used to correct the depth of the logging device which generated the logs by inserting the optimal compliance back into the correction function.

We next show examples of logging data which has been correlated and depth corrected using the method of the present invention.

Figure 3A:
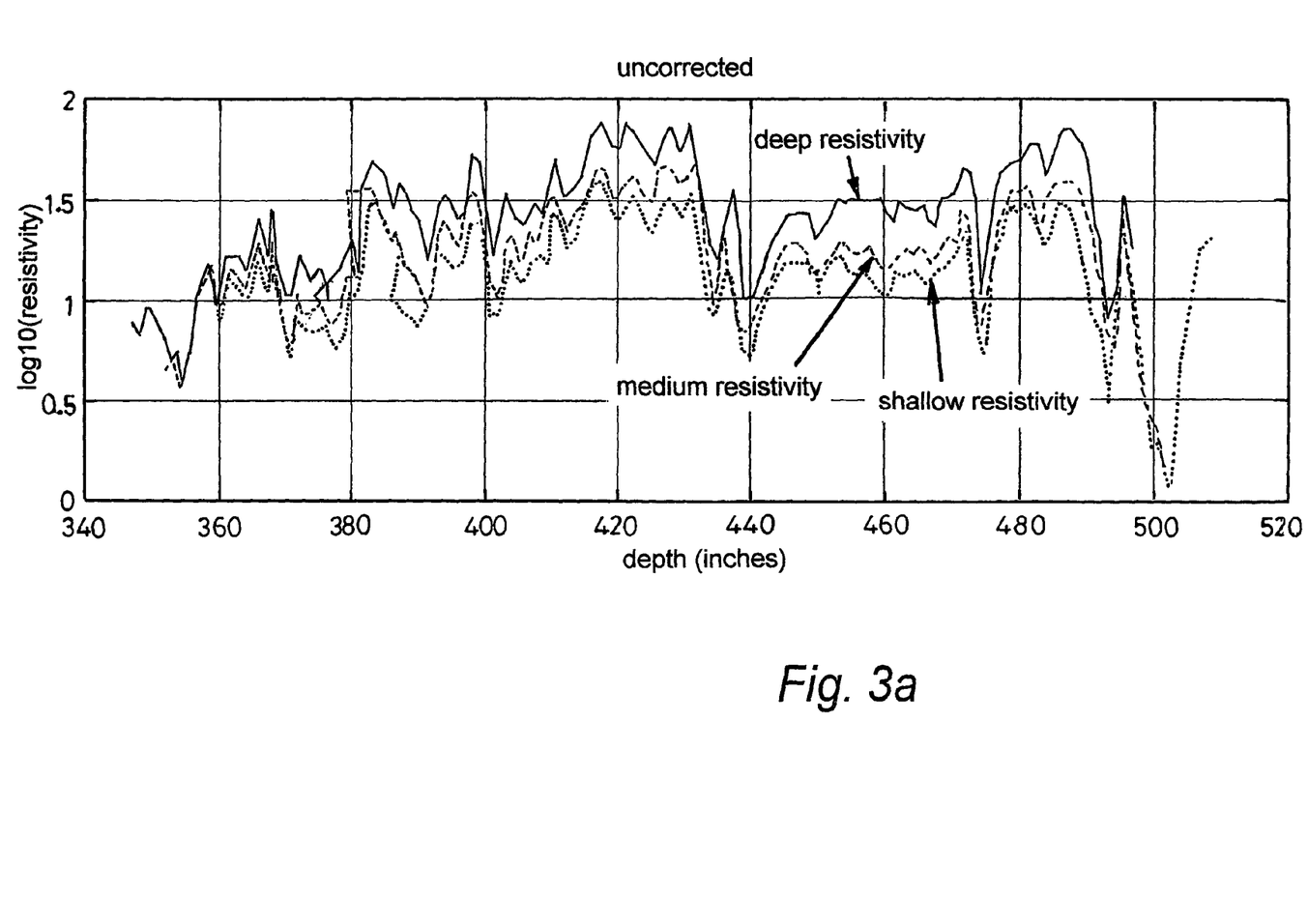
FIGS. 3a and b respectively show uncorrected and corrected resistivity logs obtained from a test well, FIGS. 4a and b respectively show uncorrected and corrected gamma ray logs obtained from a deep well.

FIG. 3*a* shows three uncorrected resistivity graphs respectively obtained from three resistivity sensors spaced 12 inches (305 mm) apart along a drill string. The depth scale is shown with respect to an arbitrary point.

Figure 3B:
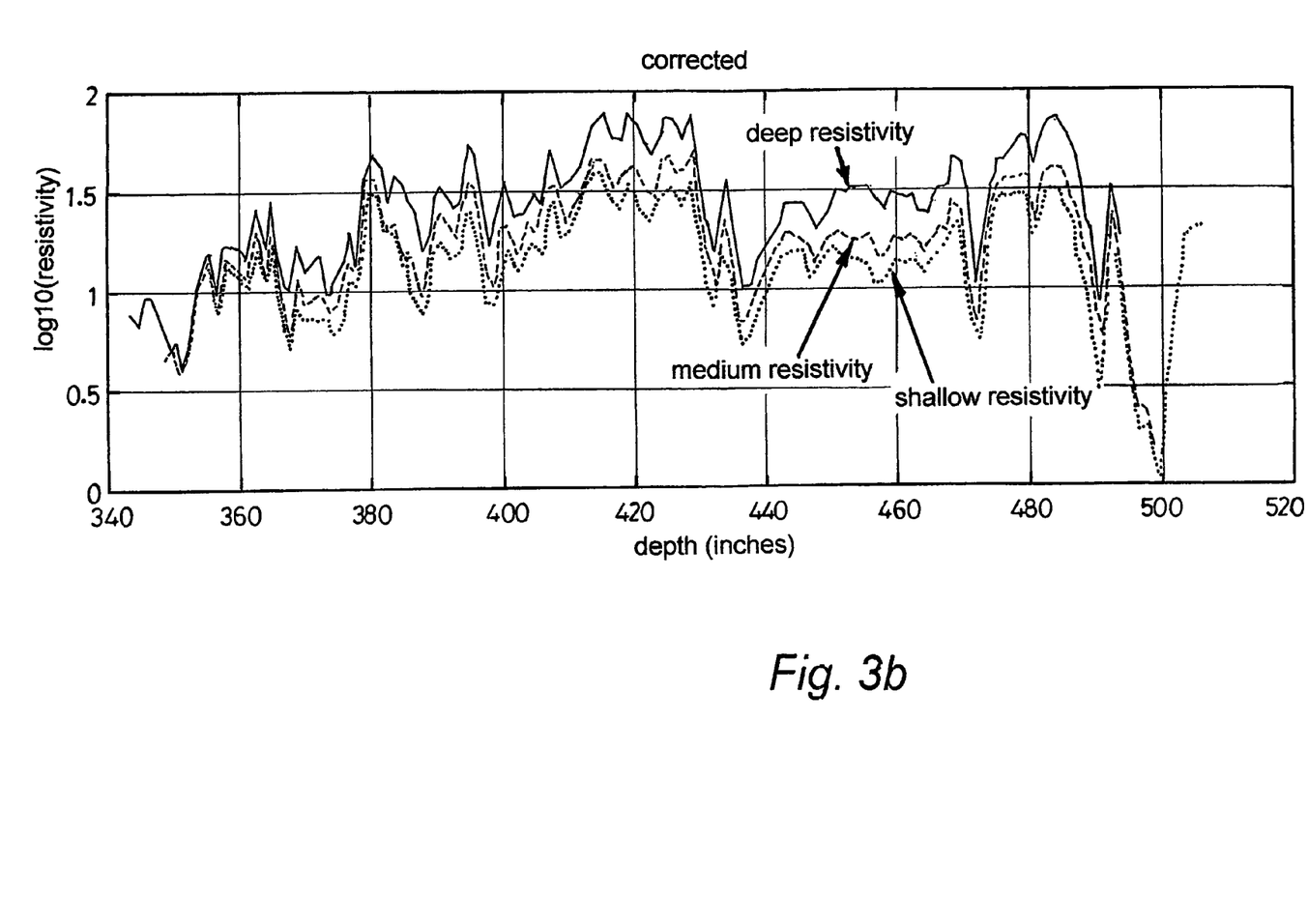

The measurements were made in a shallow test well, so the required correction was only small (drill string compliance is roughly proportional to length of drill string)—of the order of inches. However, the measurement resolution is such that corrections have a noticeable effect on the graphs. A compliance was determined using the method of the present invention to maximise the correlation between the three graphs. The compliance was then used to correct the depths of the graphs. The corrected graphs are shown in FIG. 3b. Notice in particular for the region around 380 to 390 inches where the corrected logs show very similar structure, and the lower two graphs overlie. In the uncorrected graphs the logs at this position are erratic. Also the features at around 430 to 440 inches are significantly improved by compliance correction.

Figure 4A:
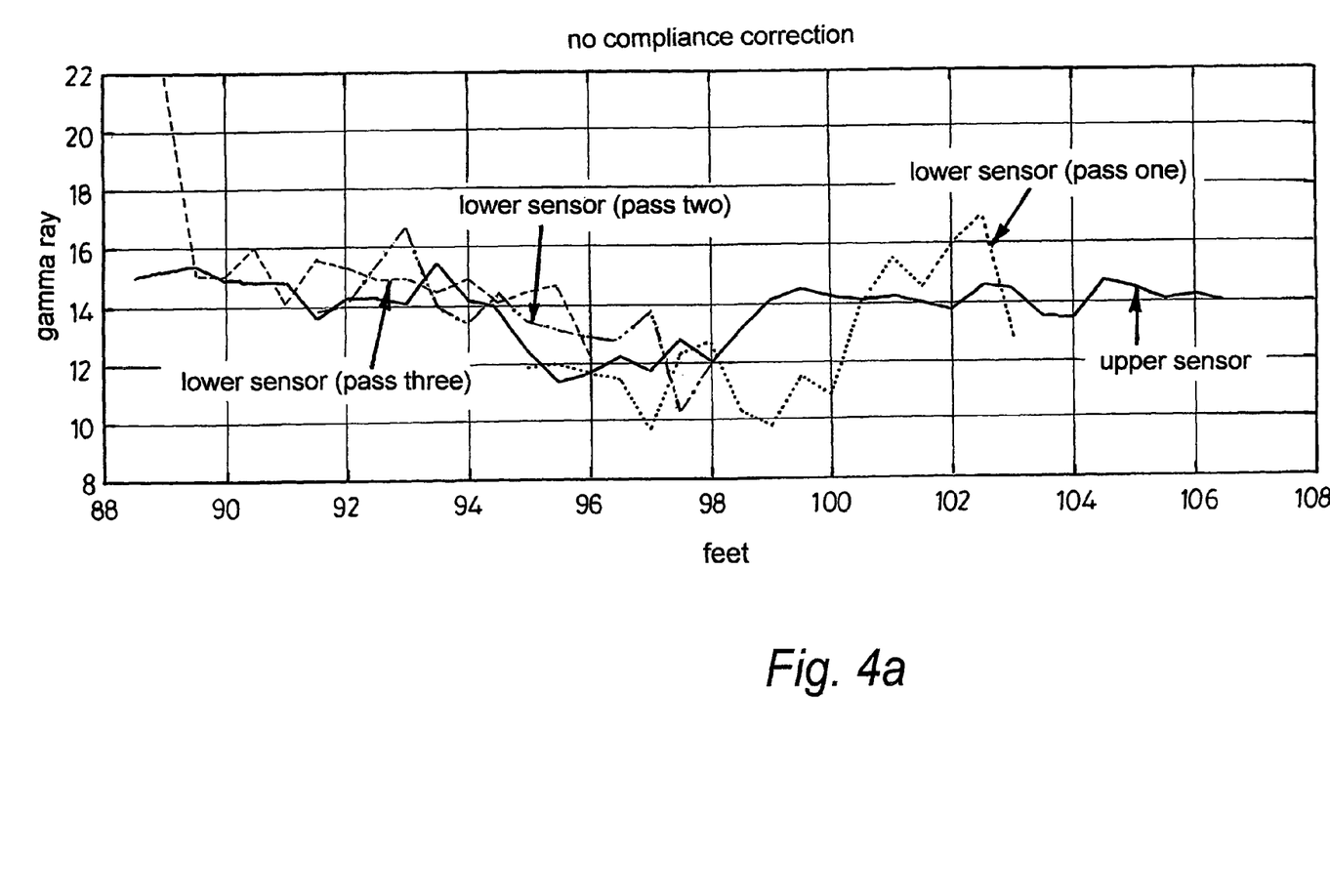

FIG. 4a shows four uncorrected logs derived from two gamma ray sensors in a deep well. In this Figure lower depth values equal deeper measurements. The lower sensor passed the same feature three times while working the pipe with different applied weights to provide three graphs. The upper sensor was deployed approximately 30 feet higher in the drill string and provided only one graph. The raw sensor measurements were depth averaged to form the logs.

Figure 4B:
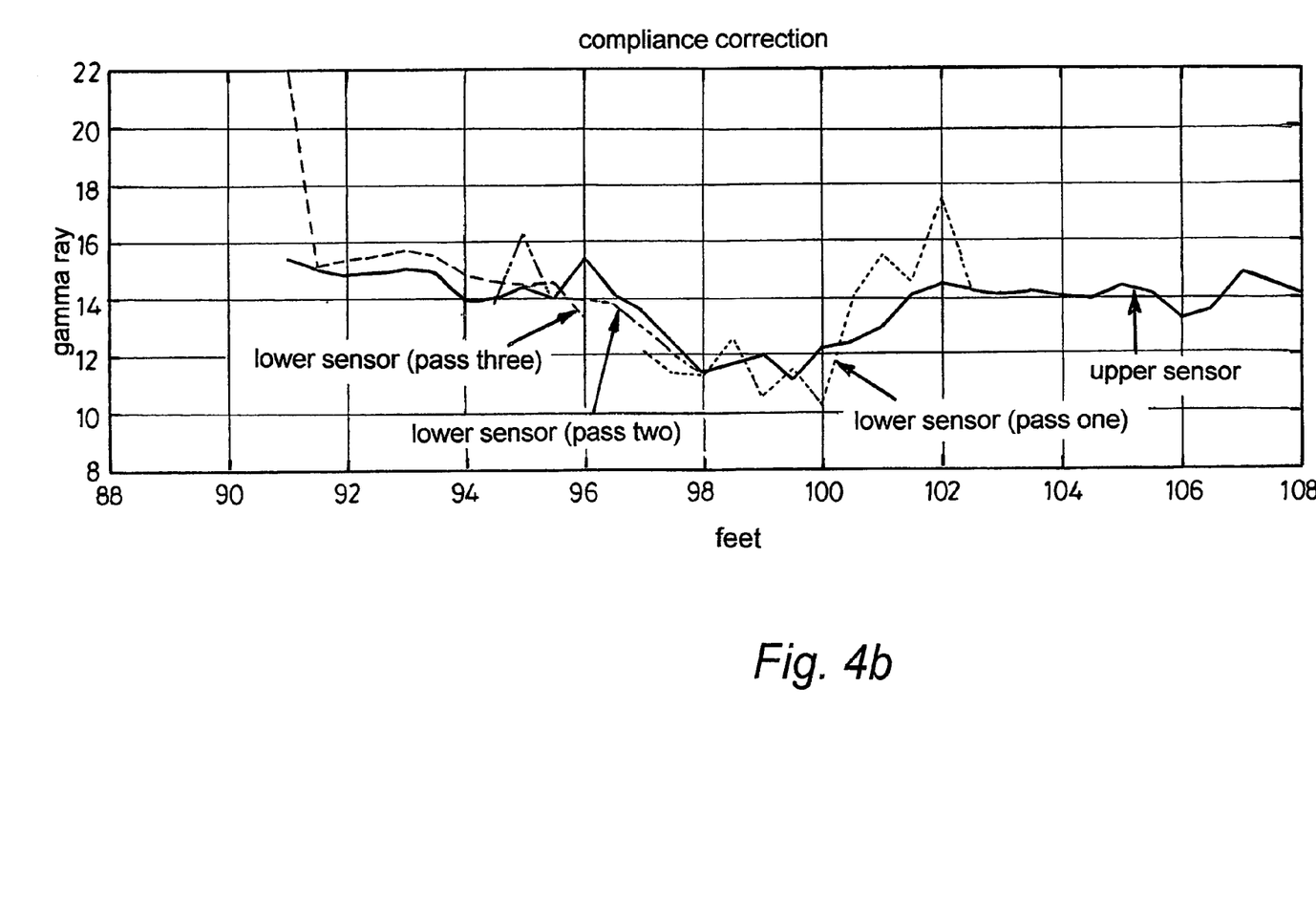

A compliance for the drill string was again determined to maximise the correlation between and correct the depths of the four graphs. The corrected graphs are shown in FIG. 4b. As a result of the correlation a gamma ray feature at 99 feet is evident. Without depth correction, there was little agreement on the position of this feature between the four graphs.

Figure 5:
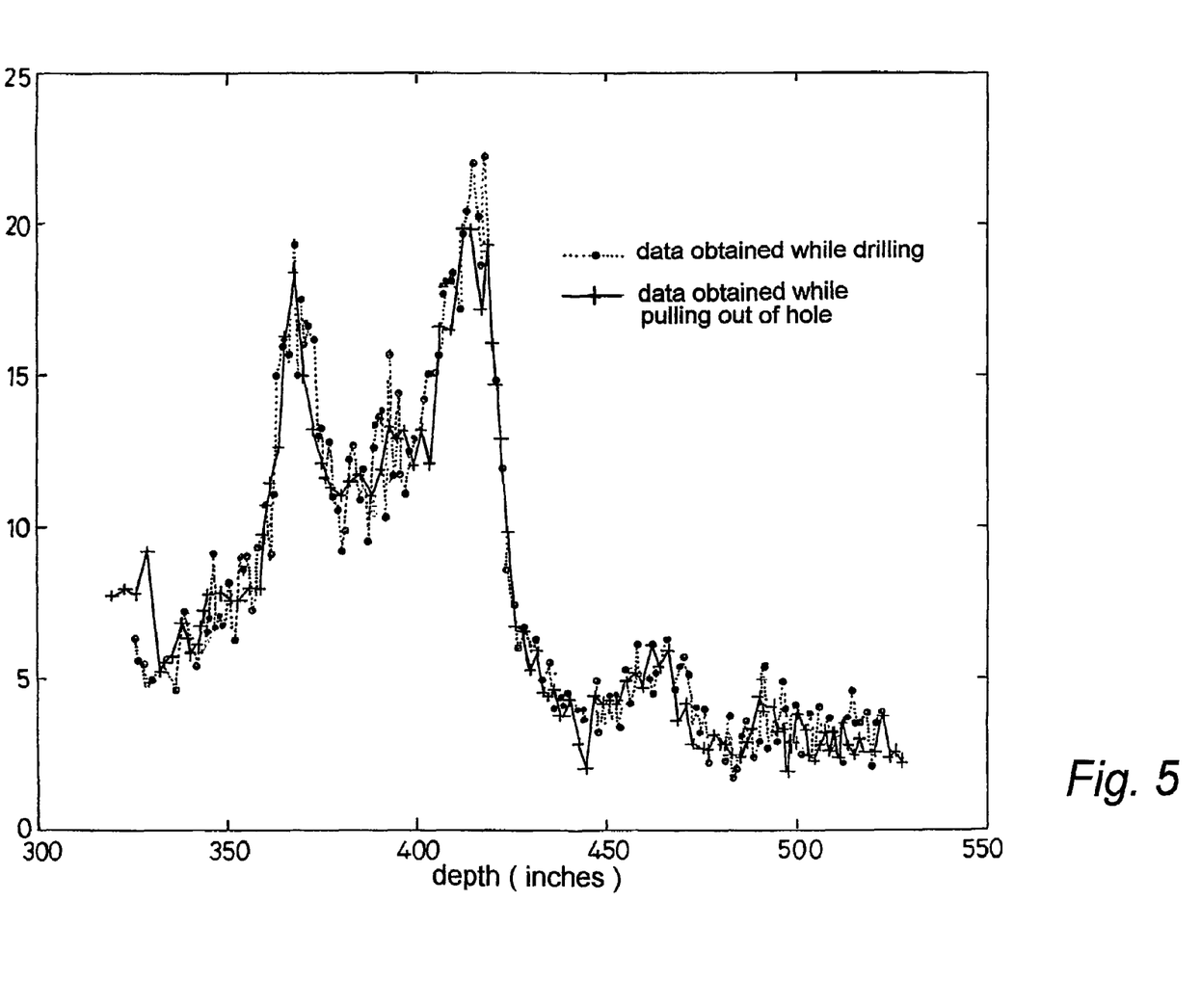
FIG. 5 shows corrected gamma ray logs for the test well of FIG. 3.

FIG. 5 shows unaveraged logs from a single gamma ray sensor in the test well of FIG. 3 while respectively drilling ahead and pulling out. The point density is higher for the drilling ahead log, as the drilling speed was approximately one fifth of the speed of pulling out of hole. The data in both graphs was corrected with a compliance derived from the resistivity data shown in FIG. 3. Additionally, however, a compensation factor was used to apply an offset correction for the transition between drilling ahead and pulling out. The offset correction was derived by maximizing the correlation of the gamma ray data between drilling ahead and pulling out.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of correcting depth of logging data measured by a logging system mounted on an elongate member extending through a wellbore to the surface comprising the steps of:
   (a) receiving sets of logging data for two or more spatially overlapping logs generated by the logging system, each set comprising measures of a characteristic associated with the wellbore at longitudinally spaced positions along the wellbore;
   (b) receiving measurement data for the period or periods of log generation, the measurement data comprising measurements of the load on the elongate member and measurements of the surface position of the elongate member;
   (c) determining a compliance parameter representing the compliance of the elongate member by comparing at least two of the sets of logging data depth corrected using a plurality of values for the compliance parameter, and selecting a value for the compliance parameter that yields a high degree of consistency between the at least two sets of logging data;
   (d) correcting the depth of at least one set of logging data measured using the logging system, using a correction function which relates the position of the logging system to at least (i) the measured load on the elongate member, (ii) the measured surface position of the elongate member, and (iii) the selected compliance parameter of the elongate member; and
   (e) outputting the corrected logging data to provide for corrective action based on the corrected logging data.

2. A method according to claim 1, wherein the elongate member is a drill string.

3. A method according to claim 2 wherein in performing step (c) the at least two of the sets of logging data are measured over a period or periods of time during which no sections of the elongate member have been added or removed.

4. A method according to claim 1 wherein in step (c) the value of the compliance parameter selected is one wherein the degree of consistency is maximized or the degree of difference is minimized between the at least two sets of logging data.

5. A method according to claim 1 wherein in step (c) the correction function further includes a depth offset for all measurements made after a time in which a depth error is believed to have occurred.

6. A method according to claim 5 wherein a depth error is believed to have occurred when adding or removing sections of the elongate member.

7. A method according to claim 5 wherein a depth error is believed to have occurred when the direction of longitudinal motion of the elongate member changes polarity.

8. A method according to claim 5 wherein a depth error is believed to have occurred when rotational speed of the elongate member changes between stationary and rotating.

9. A method according to claim 1 wherein step (c) is performed separately for data collected while sliding and rotating.

10. A method according to claim 1, wherein the logging system comprises two or more logging sensors spaced in the direction of device movement, each logging sensor generating at least one of the logs.

11. A system for correcting depth of logging data measured by a logging system mounted on an elongate member extending through a wellbore to the surface comprising:
   a data storage device for storing (a) sets of logging data for two or more spatially overlapping logs generated by the logging system, each set comprising measures of a characteristic associated with the wellbore at longitudinally spaced positions along the wellbore, and (b) measurement data for the period or periods of log generation, the measurement data comprising measurements of the load on the elongate member and measurements of the surface position of the elongate member; and
   a processor adapted to: (a) determine a compliance parameter representing the compliance of the elongate member by comparing at least two of the sets of logging data depth corrected using a plurality of values for the compliance parameter, and selecting a value for the compliance parameter that yields a high degree of consistency between the at least two sets of logging data; (b) correct the depth of at least one set of logging data measured using the logging system, using a correction function which relates the position of the logging system to at least (i) the measured load on the elongate member, (ii) the measured surface position of the elongate member, and (iii) the selected compliance parameter of the elongate member; and (c) to output the corrected logging data.

12. A system according to claim 11 wherein the processor is further adapted such that when determining the compliance parameter the at least two of the sets of logging data are measured over a period or periods of time during which no sections of the elongate member have been added or removed.

13. A system according to claim 11 wherein in the processor is further adapted to select the value of the compliance parameter such that the degree of consistency is maximized or the degree of difference is minimized between the at least two sets of logging data.

14. A system according to claim 11 wherein the processor is further adapted such that the correction function further includes a depth offset for all measurements made after a time in which a depth error is believed to have occurred.

15. A system according to claim 11 wherein the processor is further adapted to determine a separate compliance parameter for data collected while sliding and while rotating.

* * * * *